Dec. 16, 1930.                    C. F. HILL                    1,784,990
              CORONA ELIMINATION IN DYNAMO ELECTRIC MACHINES
                           Filed March 3, 1928
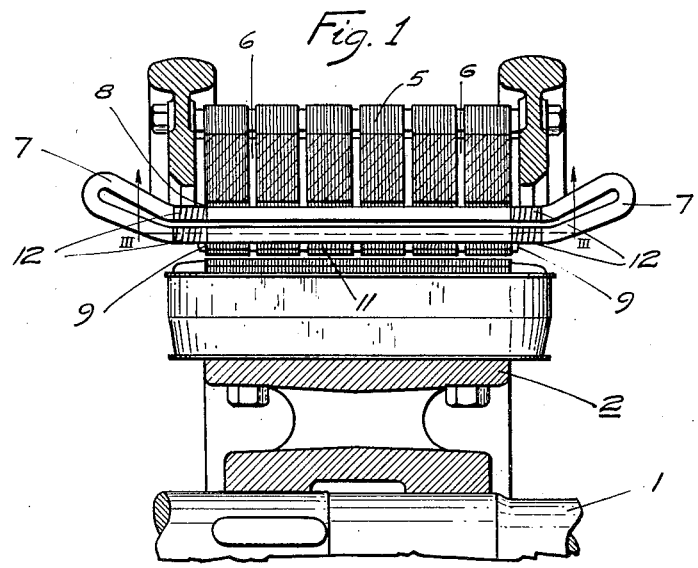
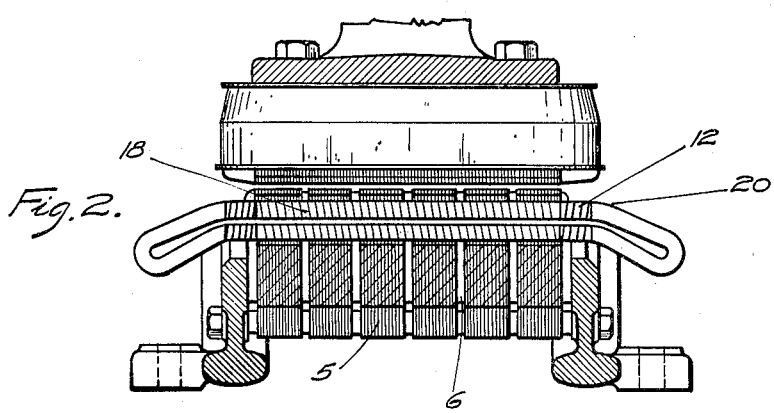
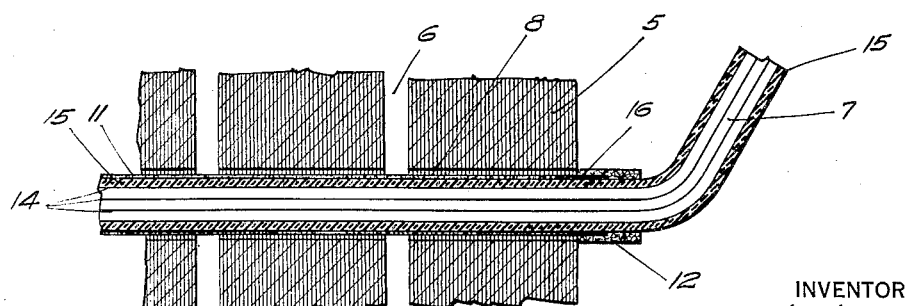
INVENTOR
Charles F. Hill.
BY
Wesley G. Carr
ATTORNEY Patented Dec. 16, 1930

1,784,990

UNITED STATES PATENT OFFICE

CHARLES F. HILL, OF EDGEWOOD, PENNSYLVANIA, ASSIGNOR TO WESTINGHOUSE ELECTRIC & MANUFACTURING COMPANY, A CORPORATION OF PENNSYLVANIA

CORONA ELIMINATION IN DYNAMO-ELECTRIC MACHINES

Application filed March 3, 1928. Serial No. 258,750.

My invention relates to windings for dynamo-electric machines, and more particularly to a method of eliminating corona from the windings of high-voltage, alternating-current machines.

In my copending application, Serial No. 182,612, filed April 11, 1927, assigned to the Westinghouse Electric & Manufacturing Company, I described a means and method of overcoming the harmful effects of corona on armature conductors lying in the slots of the magnetic core of a high-voltage machine. As described in said application, I coat the insulating covering of that portion of the armature conductor lying in the slot, with a high-resistance material, such as a colloidal solution of carbon, commercially known as aquadag, which is grounded to the slot walls of the iron laminations, and which has sufficient conductivity to maintain the ground potential of the laminations, while at the same time, it has a sufficiently high resistance to limit the circulating currents to a small value. By this method, I have completely eliminated corona within the slot, but corona appeared at the ends of the coating, shooting out longitudinally along the surface of the conductor insulation.

It is an object of my present invention to provide a method of damping out the corona at the ends of the coating outside of the slot, which comprises wrapping the ends of the coating with a fibrous material, such as asbestos tape, overlapping the tape onto the coating, and extending the same a few inches, depending on the voltage, outwardly on the insulating covering, the tape being suitably treated to have the requisite high resistance, as subsequently explained in detail.

My invention resides in a damping layer, of the character hereinafter described and claimed, for the portions of shielded armature conductors that extend out of the slots of the core. To understand the forms which my invention may take, reference may be had to the accompanying drawings, wherein Figure 1 is a sectional view showing a portion of a dynamo-electric machine, and an armature conductor embodying a damping layer in accordance with my invention, Fig. 2 is a similar view embodying my invention in a modified form, and Fig. 3 is a sectional view, on the line III—III of Fig. 1, showing, in detail, the structural arrangement of my invention.

In Fig. 1 is illustrated a dynamo-electric machine having a rotatable shaft 1 to which is fixed a rotor member 2 of usual construction. The stator member comprises a laminated core 5 having the usual radial ventilating ducts 6. The stator coils or armature conductors 7 are held in slot 8 by slot-closing wedges 9 and are provided with layers 11 of high-resistance material, such as aquadag, as set forth in my above-mentioned application, surrounding the portions of the coil sides lying within the slot 8, and with end damping layers 12 of my present invention, as hereinafter more definitely described.

In Fig. 3, the specific structure of my invention is illustrated in more detail in a cross section of portions of the coils 7 lying in the slotted portion 8 of the laminated core 5. The coils 7 comprise copper conductors 14 having an insulating covering 15 of any good dielectric material, such as micarta, mica, or the like, but preferably a mica folium which is a combination of mica and treated micarta paper prepared especially for use on high-voltage machines.

As explained in my copending application, the insulating covering 15 is painted with a colloidal solution of graphite or aquadag, forming the high-resistance coating 11 which is grounded to the slot walls and which has a resistivity of the order of 100,000 ohms per inch, so that it provides an electrostatic shield that is instrumental in preventing the formation of corona in the air space between the coating and the slot walls.

At the termination of the high-resistance coating or aquadag layer 11, which may be at, or slightly beyond, the end of the slot, there may be formed a ring of corona which would require special attention and reinforcement of the insulation at such points.

A convenient method of applying my present invention to the aquadag layer of my previous application is shown in Fig. 2, wherein the hereinabove-mentioned end layers 12 are taped on, overlapping a portion 16 of the aquadag layer 11.

The damping end layer 12 is preferably made of a fibrous or asbestos tape which is wrapped around a small portion 16 of the aquadag layer. The end layer 12 is impregnated with a material which gives it a considerably higher resistance than that of the aquadag layer, the resistance of the taped end layer being of the order of one hundred to several hundred megohms per linear inch, measured along the conductor, whereas resistances of the order of one one-thousandth as much are suitable for the coating within the slots.

Almost any suitable material having the required resistivity may be utilized. For instance, I may employ, for this purpose, copper mud mixed into a bakelite cement in the proportion of 15 grams of copper to 60 grams of cement, or mixtures of metallic dust with insulating resins and varnishes, but, preferably, I utilize a commercial grade of tri-cresyl phosphate which has properties, when impregnated in the fibrous material, that render it very suitable for use in electric machines wherein it is subject to extreme variations of heat and moisture.

The tri-cresyl phosphate which I employ is a commercial article sold under the trade name of Lindol. It is not straight tri-cresyl phosphate, as evidenced by the boiling point, but it is a mixture of various tri-aryl phosphates, with tri-cresyl predominating. It may be made by heating three molecules of a cresol with one molecule of phosphorus oxy-chloride, driving off the hydrochloric acid gas liberated by the reaction, and purifying the resultant product by washing with a solution of sodium hydroxide and subsequent distillation.

The commercial material thus formed may contain hydrochloric acid, excess phosphorus oxy-chloride, free cresols, possibly chlorine or chlorine derivatives, and/or free phenol, in addition to the other tri-aryl phosphates which are not so much impurities as closely related compounds. Of the foregoing impurities, it will be noted that hydrochloric acid is a conductor, at least in the presence of any moisture, and that some of the other products, such as the cresols and phenols, may electrolize to a very small extent but yet sufficient to produce the exceedingly slight conductivity that is required.

It will be noted that an extremely small trace of any electrical conductivity is all that is necessary to produce the effect that I desire. As will be pointed out later on, the order of conductivity which is required is that of a leaky insulator, and I may utilize any insulater having the necessary leakage, the necessary heat-resisting qualities to withstand the maximum operating temperatures of the windings, and the necessary flexibility and non-hygroscopic properties.

Some grades of absestos tape have the necessary leakage characteristics, and these may be utilized without any further treatment other than a good insulating varnish for sealing the tape to the insulating covering of the coil. But in order to have a more definite control over the leakage of the asbestos tape, I prefer to start out with a fairly pure grade, which may be obtained from the impure commercial product by removing certain impurities therefrom. It has been found sufficient, for this purpose, to bake the asbestos tape in an oven, thereby removing most of the carbon compounds therefrom and producing a tape having substantially no electrical conductivity or leakage. The resultant product may then be impregnated with a known amount or concentration of an insulating solvent or liquified material which has the necessary, or a suitable, amount of leaky impurities therein, such as have been described in connection with the commercial tri-cresyl phosphate which I now prefer to utilize. It has even been found that substantially pure tri-cresyl phosphate, which exhibits little or no leakage as an insulator, when impregnated into the baked asbestos tape just described, will produce a product which has a certain amount of leakage, probably caused by reaction with the traces of impurities still remaining in the asbestos. Considerations such as have just been stated will serve to indicate the extremely slight order of conductivity, or traces of impurities, that are required in my high-resistance conductor, or leaky insulator, in order to obtain the qualities desired.

It will be understood that the above-mentioned materials may be applied without the tape, and that the tape is employed principally to provide a convenient mechanical retainer.

The phenomenon of corona is gaseous ionization phenomenon. A certain portion of all the molecules in a gas are always ionized, due to the presence of ultra-violet radiations and other causes. The molecules of the gas are in constant movement, colliding with one another and rebounding as a result of the thermal activity of the gas, the temperature being, in fact, a measure of such movement. When an electrostatic potential-gradient exists in the gas, as a result of the presence of two spaced conductors having different electrical connections, the molecules which are ionized are given an additional acceleration which is added to their movements due to collisions, and if the potential-gradient is sufficiently high, a charged or ionized molecule will be accelerated to a sufficiently high speed to ionize the molecules with which it collides, so that ionization by collision is produced in the gas as a result of the electrostatic potential-gradient. This phenomenon is known as corona. Corona is commonly known to be harmful to the insulation in electric machines, in that it facilitates the formation of damaging nitrous and nitric acids.

Ionization is not produced in a solid dielectric until substantially the breakdown voltage of the dielectric is reached, at which time the dielectric fails, so that it may be said that corona does not appear in the solid insulation until the failure of the dielectric.

In my present invention, the end damping layer 12 has a condenser effect through the insulation to the copper conductors. At each cycle, a capacity current feeds into this condenser formed between the high-resistance end layer 12 and the conductors 14. Such a current produces an IR or voltage drop in the end damping layer 12 itself. The amount of the resistance necessary to take care of a given voltage will decrease as the frequency increases. The capacity per unit length of damping layer along the coil is different for different conditions, but, in general, may be taken to be something of the order of 15 micro-microfarads per inch.

It is obviously necessary that the resistivity of the damping layer 12 shall be such that the voltage drop per unit length shall not be above the ionization voltage or corona voltage of air for that particular spacing or arrangement of conductors, unless, of course, the damping layer is effectually covered with solid insulation, so that it is not exposed to any air, as hereinafter pointed out. If the voltage gradient along the layer is too great, corona will appear along the layer itself.

It is further necessary that the length and resistance of the damping layer shall be such as to cause the voltage drop through the damping layer to be such as to produce or allow a voltage, at the end of the layer, which is below the corona voltage of air for the particular spacing, geometrical arrangement of parts, existing there. Practically, any voltage below 5000 volts is sufficient to remove all effects of corona.

Experiments have shown that an average voltage gradient or IR drop of from 3000 to 6000 volts per inch measured along the coil is the best working range, and that there should be 4000 volts or less between the end of the asbestos tape to the copper of the coil, thus requiring, for example, that about six inches length of coil should be covered with the damping layer 12, to take care of 30,000 volts, with the materials now available, the general specifications of which have already been discussed.

The exact equation for the solution of the problem involves a special solution of the general equation for distributed capacity and resistance, with an alternating voltage applied at one end of the system, but, for practical purposes, the order of magnitude of the resistance per unit length may be obtained from the approximate equation $$r = \frac{2(E-e)10^{12}}{C\pi f L^2 E},$$

$r$ = resistance per unit length of the damping layer in ohms per inch,
$L$ = length of the damping layer,
$E$ = applied voltage between the copper and ground (iron core),
$e$ = voltage between the free end of the damping layer and the copper,
$C$ = capacity per unit length between the copper and the damping layer, in micro-microfarads, and
$f$ = frequency.

For a machine having an applied voltage $E$ of 8000, a capacity $C$ of 15 micro-microfarads per inch length of coil, a frequency $f$ of 60 cycles, the necessary resistance per unit length may be found as follows, assuming a length $L$ of 1¼ inches beyond the relatively highly conductive aquadag coating:—

$$r = \frac{2 \times (8000-4000) \times 10^{12}}{15 \times 3.14 \times 60 \times 1.56 \times 8000}$$

= approximately 229 megohms per inch length of layer.

The 1¼ inch length $L$ is estimated from the knowledge that a gradient of between 3000 and 6000 volts per inch is satisfactory. The average voltage gradient $G$, from the above equation, we find to be $$G = \frac{E-e}{L} = \frac{8000-4000}{1.25} = 3200 \text{ volts per inch.}$$

It is noted that, the longer the damping layer the lower must be the resistance for any given applied voltage $E$, because the capacity current $I$ increases very rapidly with an increase in the length; whereas the two conditions must be fulfilled that the voltage $e$ at the end of the damping layer shall not greatly exceed 5000 volts and preferably shall not exceed 4000 volts, and the average IR drop in the layer must not exceed 6000 volts per inch.

The above values are merely illustrative. For instance, if the damping layer were two inches long, with the same applied voltage of 8000, the resistance would have to be approximately 89 megohms per inch, in order to keep the end voltage $e$ down to 4000, and the potential gradient along the layer would then average only about 2000 volts per inch, which is lower than is really necessary.

As a further indication of the magnitudes involved, if $E = 30,000$ volts and $L = 6$ inches, $r = 17$ megohms per inch, and the potential gradient $G = 4300$ volts per inch, all figures being approximate.

For the several values given above, the capacity current in the damping layer, near its junction with the aquadag layer, varies between several hundredths of a milliampere and several tenths of a milliampere. While I do not care to be limited to the particular value of the current, I do regard it as an extremely important part of my invention to utilize, for the first time, the extremely small but high-voltage condenser-induced capacity currents to produce an IR drop or potential gradient in a damping layer of extremely high resistance.

The damping layer 12 is fastened to the surface of the coil with no air gap therebetween, as by applying the tape to a freshly varnished surface.

The damping layer may also be covered by painting it to any desired depth with an insulating varnish and by covering it also with other solid insulation, as indicated at 20 in Fig. 2. A cover of solid insulation which keeps out all air helps to prevent corona so that the voltage $e$ at the end and the voltage gradient along the layer can both be somewhat larger. However, even though the insulating covering does not keep out air or otherwise extend the permissible limits, it serves the very useful function of mechanically protecting the damping layer.

In the modification shown in Fig. 2, my end damping layer 12 is applied to coils which have a modified arrangement of that portion of the coil-sides which lie within the slots. The coils, instead of utilizing the aquadag coating of my previous invention, are wrapped with the asbestos tape 18, starting and enclosing one-half inch inside the core. This portion of the covering is filled with insulating varnish so that the surface is smooth for the application of the high-resistance conducting material, such as aquadag.

The end damping layer abuts against the layer 18 and the theory of operation is the same, as explained above, by the manner in which the voltage produced on the layer is tapered.

For simplifying this method with the two asbestos layers, a single continuous layer might be utilized, the portion lying within the slot being painted with insulating varnish and a coating of aquadag, and the end portion lying without the slot being dipped in, or painted with, the tri-cresyl phosphate or any of the other materials suggested hereinabove, or, the portions within the slots may be wound with asbestos tape impregnated with aquadag or some other high-resistance conductor, while the portions immediately outside the slots, and conductively connected to the first portions, may be wound with asbestos tape impregnated with the leaky insulator.

I claim as my invention:

1. A dynamo-electric machine, comprising a slotted core, an electrical conductor associated therewith having an insulating covering and a coating containing a deposit from a colloidal solution of carbon integral with the outer surface of that portion of said insulating covering which lies within the slot, a damping layer impregnated with high resistance material covering a portion of the insulating conductor-covering outside of the slot and contacting with said coating, and means for grounding said coating and said layer with the metal parts of said machine, said high-resistance material having such resistance, per linear inch of each conductor, that 100 megohms is a convenient unit of measurement.

2. An armature conductor lying in the slot of a dynamo-electric machine and having an insulating covering, a conductive coating of high-resistance material and integral with the outer surface of that portion of the covering which lies within the slot, the resistance of said coating being sufficiently low to prevent corona and sufficiently high to prevent material resistance losses and heating therein, means for grounding the coating with the walls of the slot, and a damping layer of a leaky insulating substance in contact with the coating, and extending beyond the end of the slot, the resistance of the leaky insulating substance being higher than the resistance of the conductive coating of high-resistance material, and being of the order of one to several hundred megohms per linear inch.

3. An armature conductor lying in the slot of a magnetic core, and having an insulating covering, a coating containing a deposit from a colloidal solution of carbon adhering to a portion of the outer surface of the covering lying within said slot, and contacting with the magnetic core, and an asbestos layer impregnated with tri-cresyl phosphate and overlapping the ends of the coating, the asbestos layer extending outwardly from the core.

4. In a high-voltage dynamo-electric machine, means for eliminating corona at the ends of the armature slots, comprising grounding shields on the portions of the insulating covering of the armature conductors lying in the slots, and a layer of asbestos tape on the portion of each of the conductors which projects from the slot, said tape being impregnated with a chemical compound having a high electrical resistance.

5. An armature conductor lying in the slot of a dynamo-electric machine and having an insulating covering, a conductive coating of high-resistance material integral with the outer surface of a portion of the covering lying within the slot, means for grounding the coating with the walls of the slot, the resistance of said coating being sufficiently low to prevent corona and sufficiently high to prevent material resistance losses and heating therein, and a layer of fibrous tape impregnated with a high-resistance material in contact with the coating, and extending beyond the end of the slot, the voltage drop per inch length of the layer less than the critical corona voltage of air.

6. An armature conductor lying in the slot of a dynamo-electric machine and having an insulating covering, a conductive coating of high-resistance material integral with the outer surface of a portion of the covering lying within the slot, means for grounding the coating with the walls of the slot, the resistance of said coating being sufficiently low to prevent corona and sufficiently high to prevent material resistance losses and heating therein, and a layer of fibrous tape impregnated with a high-resistance material in contact with the coating and extending beyond the end of the slot, the resistance through the layer being sufficiently high to maintain a voltage at the end of the layer below the corona point of the gaseous medium within the machine.

7. A dynamo-electric machine comprising an electrical conductor having an insulating covering, a layer of fibrous tape wrapped about the covering, and a conductive coating having a high electrical resistance effective as a grounding shield on the middle portion of the layer, at least the end portions of the layer being impregnated with a material having a higher electrical resistance and the layer being grounded at various points to the metal parts of the machine.

8. A dynamo-electric machine, comprising an electrical conductor having an insulating covering, a layer of asbestos tape wrapped about the covering, a middle portion of the layer having a conductive coating containing a deposit from a colloidal solution of carbon, end portions of the layer being impregnated with tri-cresyl phosphate, the layer being grounded at various points to the metal parts of the machine.

9. An armature conductor lying in the slot of a dynamo-electric machine and having an insulating covering, a fibrous layer painted with an insulating varnish, the surface of which is coated with a high resistance material effective as a grounding shield and lying within the slot, and a second fibrous layer abutting with the first layer, substantially external of the slot, and impregnated with a material of higher resistance than that utilized with the first layer, both of the layers being grounded to the walls of the slot.

10. In a high-voltage dynamo-electric machine of the type having insulated armature conductors having coil sides lying in slots and end connections extending out of the slots at the end of the core, means for preventing corona on the end connections near said core, comprising a damping layer of a leaky insulating substance intimately surrounding the insulation on each of said end turns for a predetermined distance, one end of said damping layer being grounded on the core, said damping layer having a very small capacity current induced therein by condenser action from the armature conductor, the length and resistance of the damper layer being such that the potential gradient along the layer is below the value at which corona will apppear along the layer itself, and the voltage between the free end of the layer and the conductor is below the corona voltage for the particular conditions existing at this point.

11. In a high-voltage dynamo-electric machine of the type having insulated armature conductors having coil sides lying in slots and end connections extending out of the slots at the end of the core, means for preventing corona on the end connections near said core, comprising a damping layer of a leaky insulating substance intimately surrounding the insulation on each of said end turns for a predetermined distance, one end of said damping layer being grounded on the core, said damping layer having a very small capacity current induced therein by condenser action from the armature conductor, the resistance of the damping layer being of the order of one to several hundred megohms per linear inch.

12. In a high-voltage dynamo-electric machine of the type having insulated armature conductors having coil sides lying in slots and end connections extending out of the slots at the end of the core, means for preventing corona on the end connections near said core, comprising a damping layer of a leaky insulating substance intimately surrounding the insulation on each of said end turns for a predetermined distance, one end of said damping layer being grounded on the core, said damping layer having a very small capacity current induced therein by a condenser action from the armature conductor, the length and the resistance of the damping layer being such that the average potential gradient along the layer is less than about 6,000 volts per inch.

13. In a high-voltage dynamo-electric machine of the type having insulated armature conductors having coil sides lying in slots and end connections extending out of the slots at the end of the core, means for preventing corona on the end connections near said core, comprising a damping layer of a leaky insulating substance intimately surrounding the insulation on each of said end turns for a predetermined distance, one end of said damping layer being grounded on the core, said damping layer having a very small capacity current induced therein by condenser action from the armature conductor, the resistance and the length of the damping layer being such that the potential of the end of the layer is not in excess of 5000 volts with respect to the conductor, and also such that the conductor voltage less said end potential is less than 6000 volts multiplied by said length in inches.

14. An armature conductor lying in the slot of a dynamo-electric machine and having an insulating covering, a conductive coating of high-resistance material and integral with the outer surface of a portion of the covering lying within the slot, the resistance of said coating being sufficiently low to prevent corona and sufficiently high to prevent material resistance losses and heating therein, means for grounding the coating with the walls of the slot, and a damping layer of a leaky insulating substance intimately surrounding the insulating covering and projecting beyond the end of said slot for a predetermined distance, said layer being in contact with said coating and grounded to the machine, the resistance of the leaky insulating substance being higher than the resistance of said conductive coating of high-resistance material, and the length and the resistance of the damping layer being such that the potential gradient along the layer itself and the voltage between the free end of the layer and the conductor is below the corona voltage for the particular conditions existing at this point.

15. An armature conductor lying in the slot of a dynamo-electric machine and having an insulating covering, a conductive coating of high-resistance material surrounding a portion of said covering and grounded to walls of the slot, the resistance of said coating being sufficiently high to prevent corona and sufficiently low to prevent material resistance losses and heating therein, a high-resistance damping layer of fibrous material overlapping the ends of said coating and surrounding said covering external of said slot, and a coating of solid insulating material intimately surrounding the fibrous damping layer.

In testimony whereof, I have hereunto subscribed my name this 28th day of February, 1928.

CHARLES F. HILL.